US008520970B2

(12) United States Patent
Strandemar

(10) Patent No.: US 8,520,970 B2
(45) Date of Patent: *Aug. 27, 2013

(54) INFRARED RESOLUTION AND CONTRAST ENHANCEMENT WITH FUSION

(75) Inventor: Katrin Strandemar, Rimbo (SE)

(73) Assignee: Flir Systems AB, Taby (SE)

( * ) Notice: Subject to any disclaimer, the term of this patent is extended or adjusted under 35 U.S.C. 154(b) by 637 days.

This patent is subject to a terminal disclaimer.

(21) Appl. No.: 12/766,739

(22) Filed: Apr. 23, 2010

(65) Prior Publication Data

US 2011/0262053 A1    Oct. 27, 2011

(51) Int. Cl.
*G06K 9/40* (2006.01)
*H04N 5/33* (2006.01)

(52) U.S. Cl.
USPC ........................................................ 382/263

(58) Field of Classification Search
USPC ......... 382/284, 294, 299, 263, 264; 348/164, 348/135
See application file for complete search history.

(56) References Cited

U.S. PATENT DOCUMENTS

| | | | | |
|---|---|---|---|---|
| 4,661,986 A | * | 4/1987 | Adelson | 382/154 |
| 5,140,416 A | * | 8/1992 | Tinkler | 348/33 |
| 5,488,674 A | * | 1/1996 | Burt et al. | 382/284 |
| 7,620,265 B1 | | 11/2009 | Wolff | |
| 7,876,973 B2 | * | 1/2011 | Fairbanks et al. | 382/263 |

FOREIGN PATENT DOCUMENTS

| | | |
|---|---|---|
| CN | 101226635 | 7/2008 |
| CN | 101404084 | 4/2009 |
| EP | 0 973 137 | 1/2000 |

OTHER PUBLICATIONS

Gangkofner, Ute G., et al., "Optimizing the High-Pass Filter Addition Technique for Image Fusion," Photogrammetric Engineering & Remote Sensing, vol. 74, No. 9, Sep. 1, 2008, pp. 1107-1118.
Ager, Thomas P., et al., "Geo-positional Accuracy Evaluation of QuickBird Ortho-Ready Standard 2A Multispectral Imagery," Algorithms and Technologies for Multispectral, Hyperspectral, and Ultraspectral Imagery X, vol. 5425, Aug. 12, 2004, pp. 488-499.
Hao et al., "An Infrared Image Fusion Algorithm Based on Lifting Wavelet Transform", Laser & Infrared, Jan. 31, 2009, vol. 39, No. 1, pp. 97-100.
Yan Jixiang, "Infrared Image Sequence Enhancement Based on Wavelet Transform", Full-Text Database of China Excellent Master Degree Thesis, Information Technology Collection, Jan. 15, 2009, No. 01, pp. 1-69.

* cited by examiner

*Primary Examiner* — Yon Couso
(74) *Attorney, Agent, or Firm* — Haynes and Boone, LLP

(57) ABSTRACT

The present disclosure relates to a method of improving an IR image comprising capturing a visual image and an IR image of an object, altering a resolution of at least one of said visual image and IR image, high pass filtering said visual image to generate a processed visual image, low pass filtering said IR image to generate a processed IR image, and combining information from said processed visual image and said processed IR image to generate a combined image.

24 Claims, 7 Drawing Sheets

Fig. 3a
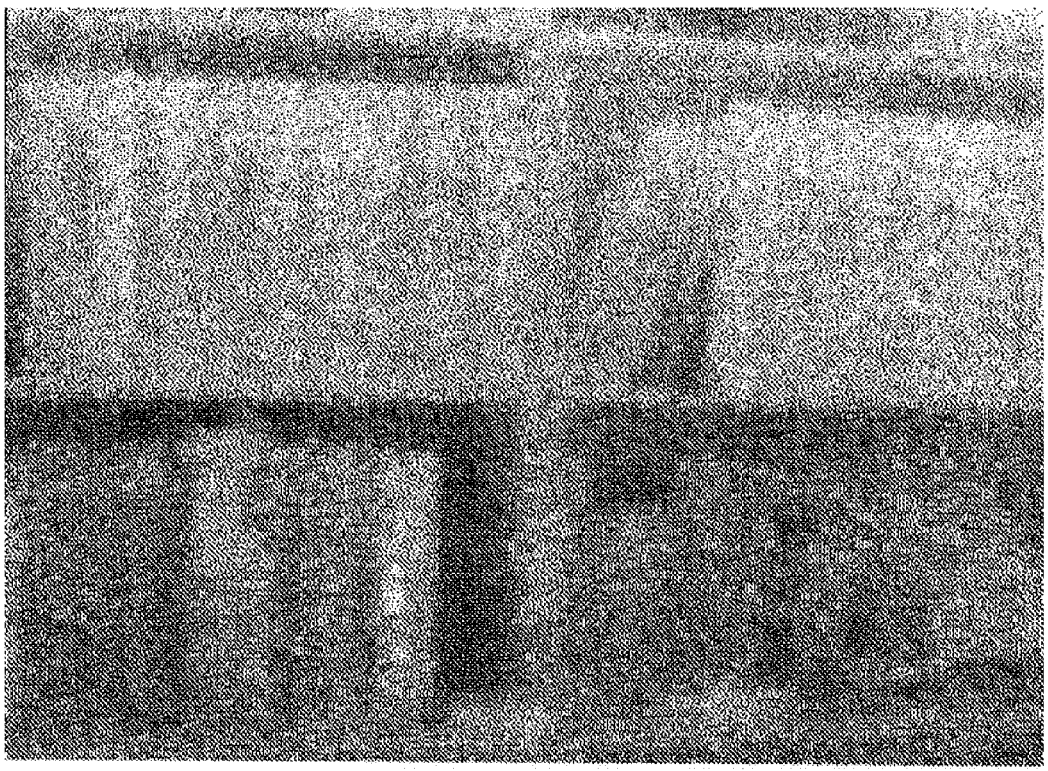
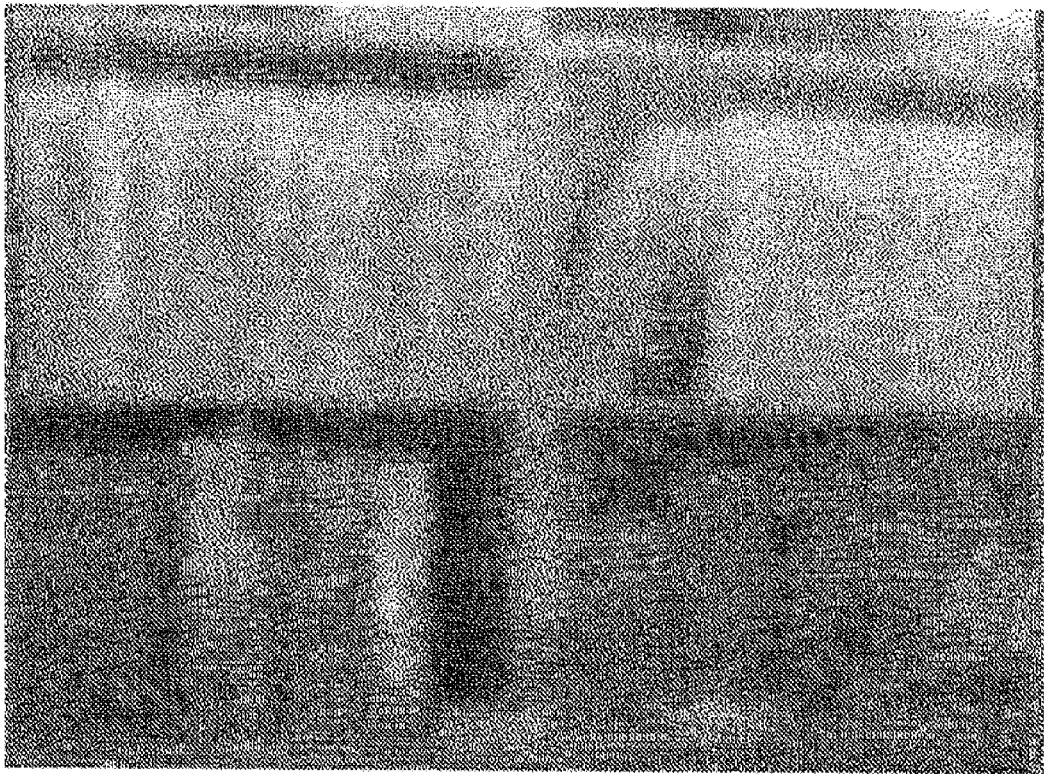
Fig. 3b

Fig. 3c
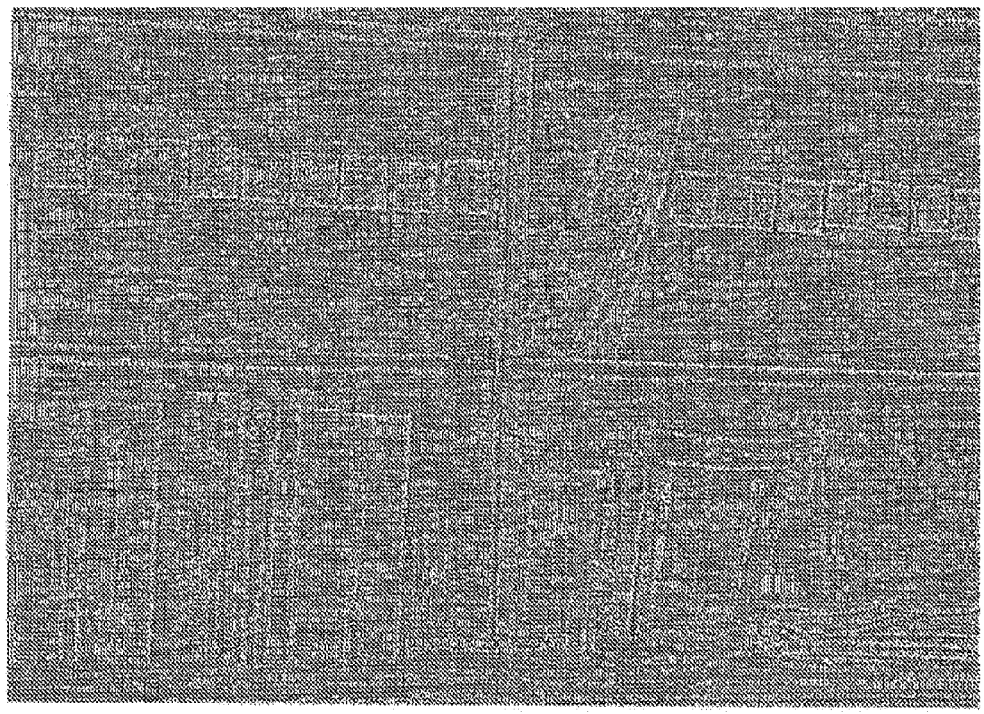
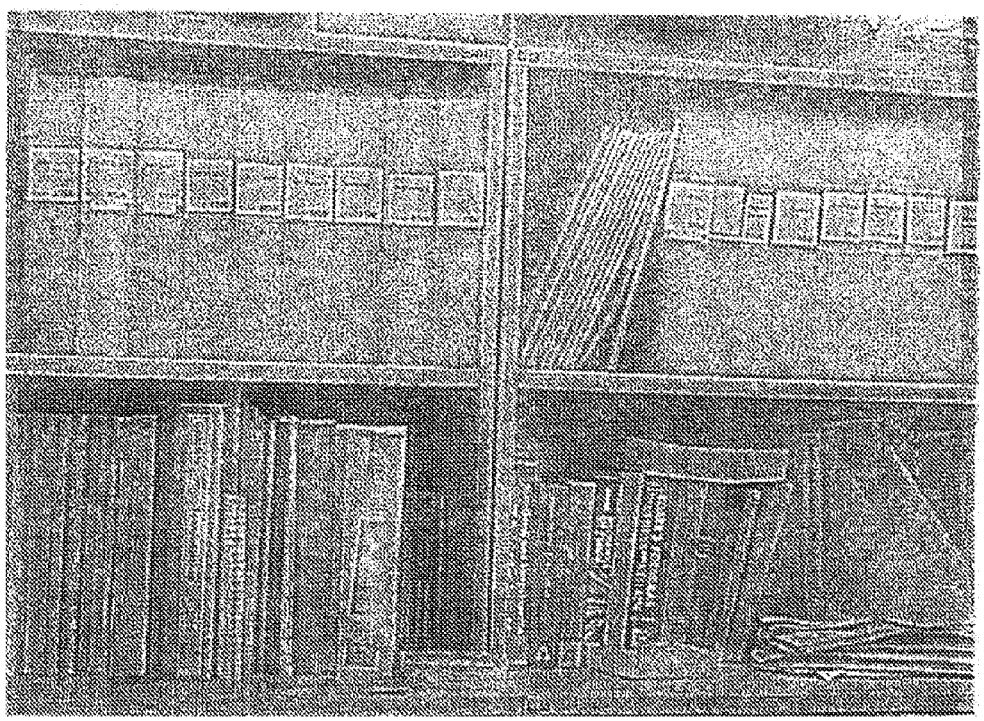
Fig. 3d

INFRARED RESOLUTION AND CONTRAST ENHANCEMENT WITH FUSION

TECHNICAL FIELD

The present disclosure relates to a method, camera, software, and system for improving an infrared ("IR") image.

RELATED ART

Within the area of image processing, an IR image of an object can be enhanced by combining the IR image with image information from a visual image. This combination is known as "fusion." A number of technical problems arise when attempting to accomplish such combination and enhancement.

Typically, a camera is provided to capture a visual image and an IR image and to process these images so that they can be displayed together. The combination is advantageous in identifying variations in temperature in an object using IR data from the IR image while at the same time displaying enough data from the visual image to simplify orientation and recognition of objects in the resulting image for a user using the camera.

Since the capturing of the IR image and the visual image may be performed by different components of the camera, the optical axes between the imaging components may be at a distance from each other and an optical phenomenon known as parallax will arise. To eliminate this and the error arising from an angle between the optical axes, the images must be aligned.

A method for aligning IR images and visible light images is disclosed in WO2009/008812 (Flir Systems AB), where the images are aligned based on a position of a focus motor for determining a distance to an object being captured by the imaging parts.

When combining an IR image with a visual image, a number of different methods are known. The most commonly used are known as threshold fusion and picture-in-picture fusion.

In a method for performing a threshold fusion of images, a visual image and an IR image of the same object or objects are captured. In the IR image, a temperature interval is selected and only those pixels of the image that correspond to temperatures inside the selected interval are chosen and displayed together with information data from all other pixels. The resulting combination image shows the visual image except for those areas where a temperature inside the selected interval can be detected and displays data from the IR image in these pixels instead. For example, when a wet stain on a wall is to be detected, a threshold fusion can be used for determining the extent of the moisture by setting the temperature threshold to an interval around the temperature of the liquid creating the stain. Other parts of the wall will be closer to room temperature and will show up as visual data on a screen, so that the exact position of the stain can be determined By seeing a texture of the wall, for instance a pattern of a wallpaper, the location of the stain can be further determined in a very precise way.

When performing picture-in-picture fusion, a visual image and an IR image showing the same object or objects are captured, and the pixels inside a predetermined area, often in the form of a square, are displayed from the IR image while the rest of the combined image is shown as visual data. For example, when detecting a deviation in a row of objects that are supposed to have roughly the same temperature, a square can be created around a number of objects and moved until a faulty object is captured besides a correctly functioning one and the difference will be easily spotted. By displaying elements from the visual image outside this square, such as text or pattern, for instance, the precise location of the objects with a specific temperature can be more easily and reliably determined.

The methods for threshold fusion and picture-in-picture fusion all display the chosen section of the combined image as IR data while the rest is shown as visual data. This has the disadvantage that details that are visible in the visual image are lost when showing IR data for the same area. Likewise, temperature data from the IR image cannot be shown together with the shape and texture given by the visual image of the same area.

Some methods exist for blending IR data and visual data in the same image. However, the results are generally difficult to interpret and can be confusing to a user since temperature data from the IR image, displayed as different colours from a palette, are blended with colour data of the visual image. As a result, the difference between a red object and a hot object, for instance, or a blue object and a cold object, can be impossible to discern. Generally, the radiometric aspects of the image, i.e. the significance of the colours from the palette, are lost when blending the IR image with the visual image.

Thus, there exists a need for an improved way of providing a combined image comprising data from an IR image and data from a visual image together.

SUMMARY

The overall object of the present disclosure is to solve or at least to minimise the problems mentioned above. This is achieved by a method, a camera, a system, or a software according to the claims, where information from a low pass filtered IR image is combined with information from a high pass filtered visual image to yield a combined image. As a result, contrasts from the visual image can be inserted into an IR image showing temperature variations, thereby combining the advantages of the two image types without losing clarity and interpretability of the resulting combined image.

More specific aspects of the embodiments of the present disclosure are explained below.

Since the resolution of an IR image is generally much lower than that of a visual image, due to properties of an IR camera compared to a visual camera, the resolution of the IR image may be up-sampled to the resolution of the visual image. As a result, an increased level of detail can be achieved and a more easily analysed combined image presented to a user.

In another example, the visual image can be down-sampled to fit the resolution of the IR image, or both images can be sampled to fit a third resolution, if suitable. This enables the images to be combined in a manner that is convenient and suitable regardless of how they are to be displayed. In one example, the third resolution can be that of a display screen where the combined image is to be displayed.

Additionally, high pass filtering of the visual image and low pass filtering of the IR image by use of a spatial filter that is moved across the images, pixel by pixel, may be performed. As a result, the IR image can be rendered smooth, eliminating or at least reducing noise from the original image. Additionally, areas with large contrasts can be located in the visual image. For example, sharp edges visible in the original IR image may be removed by the filtering, thereby reducing the risk of double edges showing up in a combined image if the the IR image and the visual image are not aligned.

When combining the images, adding the high pass filtered visual image to the IR image adds contours and contrasts to the IR image but does not otherwise alter it. As a result, the borders and edges of objects captured by the images can clearly be seen in the combined image, while at the same time maintaining a high level of radiometry.

In one example, to preserve the palette of the IR image, only the luminance component of the filtered visual image may be added to the IR image. As a result, the colours are not altered and the properties of the original IR palette maintained, while at the same time adding the desired contrasts. To maintain the IR palette through all stages of processing and display is beneficial, since the radiometry can in this way be kept throughout and the interpretation of the combined image be facilitated for the user.

When combining the luminance of the visual image with the IR image, a factor alpha can be used to determine the balance between the two images. This factor can be decided by a camera or system itself, using suitable parameters for determining the level of contour needed from the visual image to create a good image, but can also be decided by a user by giving an input to the camera or system. The factor can also be altered at a later stage, such as when images are stored in the system or in a PC or the like and can be adjusted to suit any demands from the user.

Before displaying the resulting combined image to a user, a high resolution noise can be added to the image in order to create an impression of high resolution and increased detail and make the image more easily interpreted by the user.

BRIEF DESCRIPTION OF THE DRAWINGS

FIG. 3a shows an IR image in halftone.

FIG. 3b shows the IR image of FIG. 3a in halftone after low pass filtering.

FIG. 3c shows a high pass filtered visual image in halftone.

FIG. 3d shows a combination of the low pass filtered IR image of FIG. 3b with the high pass filtered visual image of FIG. 3c in halftone.

DETAILED DESCRIPTION

Figure 1:
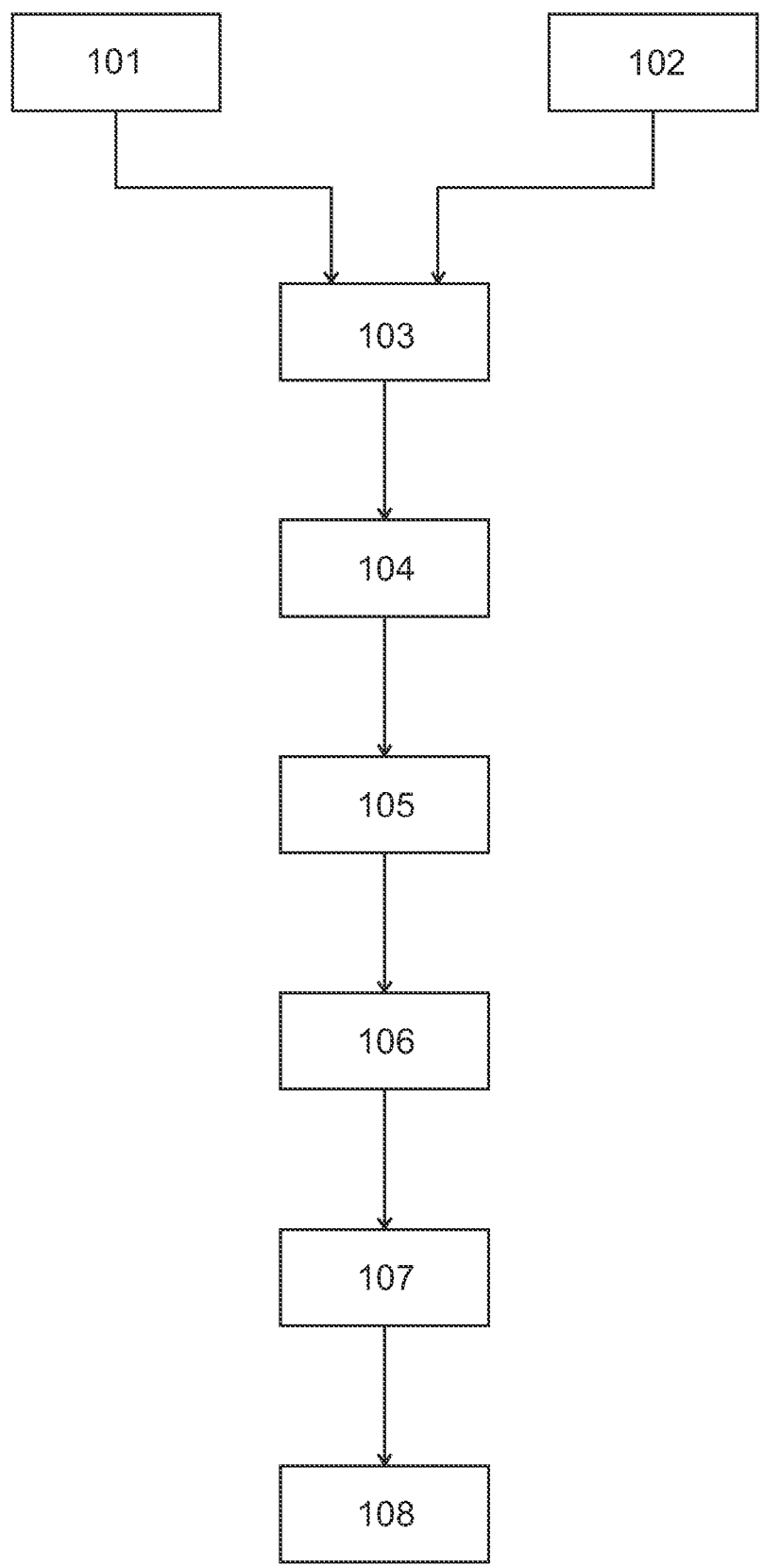
FIG. 1 shows a flow chart of a method according to an exemplary embodiment.

In FIG. 1, an exemplary method according to the present disclosure can be seen. At block 101, a visual image is captured and at block 102, an IR image is captured. The visual image and IR image may be captured by an optical sensor and an IR sensor, respectively. After capture, the visual image and the IR image may be aligned at block 103 to compensate for the parallax between the optical axes that generally arises due to differences in placement of the sensors for capturing said images and the angle created between these axes because of mechanical tolerances that generally prevents them being mounted exactly parallel.

The blocks 101, 102 can be performed simultaneously or one after the other. In one example, the images may be captured at the same time or with as little time difference as possible, since this will decrease the risk for alignment differences due to movements of a camera unit capturing the visual and IR images.

After alignment at block 103, the IR image may be up-sampled to increase its resolution at block 104. A normal resolution for an IR image can for instance be 320×240 pixels, while a normal resolution for a visual image can be around 5 M pixels. In order to compensate for this difference and successfully combine the images, at least one of them may have its resolution altered to match the other. In one example, this may be done by up-sampling the IR image to the resolution of the visual image through interpolation.

As an alternative to up-sampling the IR image, the visual image may be down-sampled to fit the resolution of the IR image, or both images can be sampled to fit a third resolution. This enables the images to be combined in a manner that is convenient and suitable regardless of how they are to be displayed.

If the combined image is to be stored and displayed by a PC or other device with a high resolution, it can be convenient to up-sample the IR image to fit the generally higher resolution of the visual image. However, if the combined image is to be displayed by a system with much lower resolution, it may be more suitable to down-sample the visual image to fit this requirement. A third resolution may be selected to be the resolution of a display screen where the combined image is to be presented. It is, however, beneficial if the resolutions of the visual image and the IR image, respectively, are the same before the images are to be combined, so that a suitable matching of data for each pixel of the images can be performed.

At block 105, the visual image may be high pass filtered by using a spatial filter and at block 106, the IR image may be low pass filtered. The resulting high pass filtered visual image and the low pass filtered IR image may be combined at block 107 and before displaying the resulting combined image a high resolution temporal noise can be added at block 108.

The purpose of the low pass filtering performed at block 106 is to smooth out unevenness in the IR image from noise present in the original IR image captured at block 102. Low pass filtering may be performed by placing a spatial core 203 over each pixel of the image and calculating a new value for said pixel by using values in adjacent pixels and coefficients of said spatial core 203. For example, spatial core 203 may be a 3×3 filter core having a coefficient value of 1 in each position. The filtered value of a pixel may be calculated by multiplying the original pixel value and the eight adjacent pixels by their respective filter coefficients, adding them together, and then dividing by the number of pixels added (in this example, 9). This may be performed for each pixel of the image. The result is a low pass filtered image having a smoother appearance than the original. One skilled in the art will appreciate that the coefficient values of the filter core may be set to different values and that the size of the filter core may be a size other than the 3×3 filter described above.

A high pass filtering is performed for the purpose of locating contrast areas, i.e. areas where values of adjacent pixels display large differences, such as sharp edges. A resulting high pass filtered image may be generated by subtracting a low pass filtered image from the original image, calculated pixel by pixel. For example, a 3×3 filter having a coefficient value of 1 in each position may be used to generate a low pass filtered image as described above. The resulting low pass filtered image may be subtracted from the original image, one pixel at a time, in a manner well-known in the art, to generate the high pass filtered image. One skilled in the art will appreciate that the coefficient values of the filter core may be set to different values and that a size of the filter core may be a size other than the 3×3 filter core described above.

Figure 2:
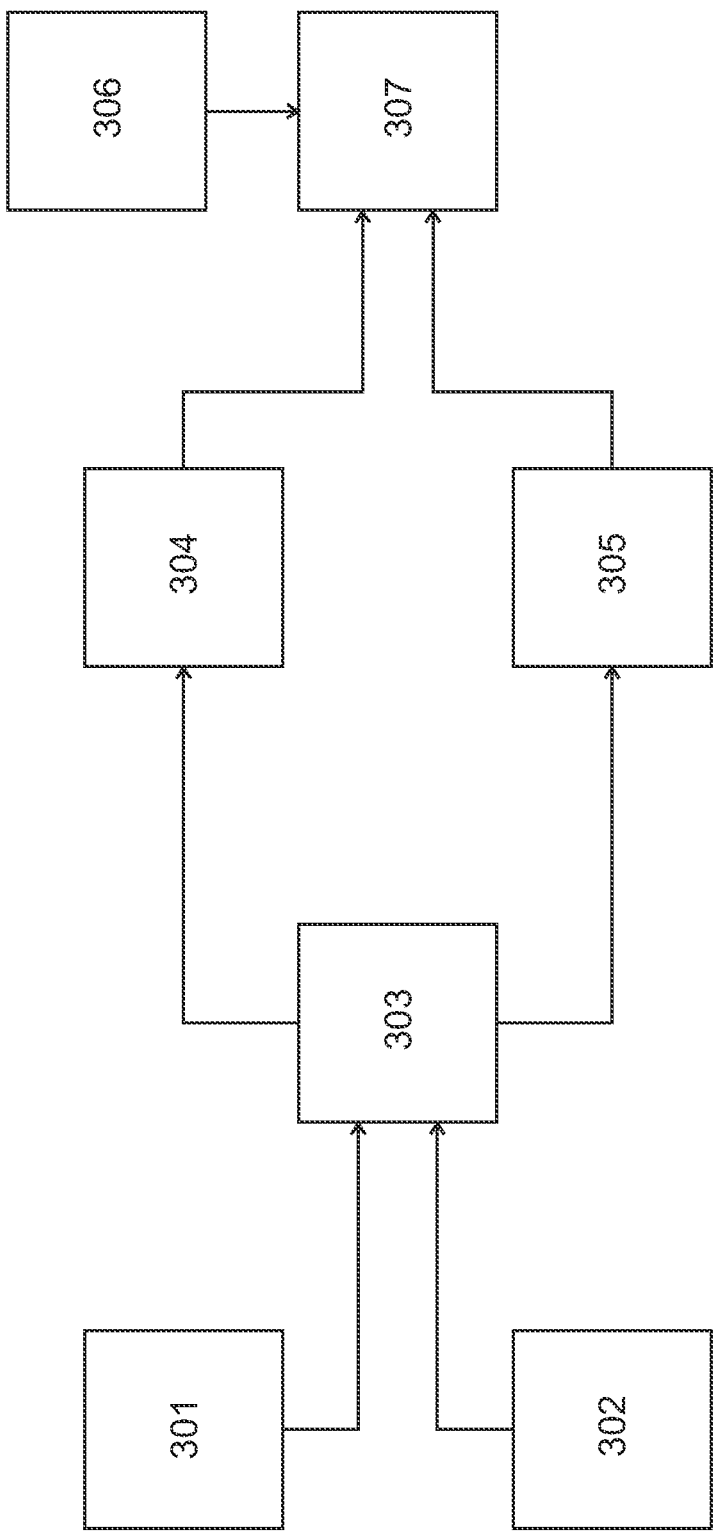
FIG. 2 shows a schematic view of a method with the images of the different stages of the method.

FIG. 2 shows the images that are produced at different blocks of the method illustrated by FIG. 1. A visual image 301 that is captured at block 101 is used, along with an IR image 302 captured at block 102, as input for up-sampling and filtering during processing 303, corresponding to blocks 103, 104, 105, 106.

After processing 303, a high pass filtered image 304 of the visual image is shown, where the contours of objects present in the original visual image 301 can be seen. A low pass filtered and up-sampled image 305 of the IR image 302 is also shown. The up-sampling has increased the resolution of the image and now each object can be seen more clearly, without showing much noise in the form of blurs or graininess in the low pass filtered image 305. Arrows from the high pass filtered and low pass filtered images 304, 305 that can now be described as processed images 304, 305, indicate a combination of these images 304, 305 to form a combined image 307 where the processed IR image 305, displaying the smooth temperature changes is combined with the processed visual image 304 where the contours from the objects of the original visual image 301 are also shown. The combined image 307 thus displays the advantages of the IR image 302, where any differences in temperature across the objects are shown, with the contours from the processed visual image 304 in order to show the shape of each object more clearly.

High resolution noise 306 may be added to the combined image 307, corresponding to block 108, in order to render the resulting image more clearly to the viewer and to decrease the impression of smudges or the like that may be present due to noise in the original IR image 302 that has been preserved during the low pass filtering of said IR image 302.

FIG. 3a shows the IR image 302 immediately after capture at block 102. The object shown represents a bookcase with binders arranged in rows and with shelves fitted at certain heights. As can be seen, the objects are at different temperatures, shown as different sections, where the uppermost parts of the image and the binders placed on the middle shelf being warmer than the lower shelf or the areas beside and above the binders. The actual shapes of the objects depicted are difficult to discern, since no contours of the objects other than the lines between different temperatures are displayed. It would therefore be very difficult for a user confronted with this image alone to identify a specific object of a certain temperature. The IR image has been coloured according to a chosen colour space (described further below), by adding colour to the signal after filtering.

FIG. 3b shows the low pass filtered IR image 305. The spatial filtering has smoothed out unevenness in the captured IR image 302 and made it easier to differentiate between different objects and has removed noise from the image 302. Also, the edges between these objects have been smoothed out. This may be done since contours are to be added from the filtered visual image 304, and any alignment error between the images would otherwise result in double contours that might be distracting to a viewer.

FIG. 3c shows the high pass filtered visual image 304 that results after filtering the captured visual image 301. Now, mainly the contours and edges of the original visual image 301 can be seen, the edges between objects as well as lines such as text on the binders or patterns from the books are shown.

FIG. 3d shows the combined image 307 after the original IR image 302 has been up-sampled, low pass filtered, and combined with a high pass filtered visual image of the same objects. The areas of different temperatures can still be seen, but the borders between them have become clearer and contour lines for the binders and the shelves have been added, originating from the high pass filtered visual image and showing details that cannot be seen in an IR image, such as text or other visual patterns. An increased clarity also comes from the low pass filtering of the IR image, where noisy pixels within larger fields of different temperature have been smoothed out to form larger areas that are more similar. As a result, at least a portion of the noise that may arise from the conditions under which the original image was captured can be eliminated.

FIGS. 5a-5d depict the images of FIGS. 3a-3d described above, but in a manner where areas of different temperature are marked by different patterns, instead of in halftone. Everything that is said with reference to FIGS. 3a-3d can thus be directly applied to FIGS. 5a-5d, respectively.

The low pass filtering that is performed on the IR image 302 may be performed by using a spatial filter with a suitable filter core, as described above, in order to calculate a new value for each pixel depending on the previous value and those of the surrounding pixels. The high pass filtering is generally performed by applying a low pass filter and subtracting the resulting low pass filtered image from the original image, as described above, leaving only lines and edges to be seen in the high pass filtered image. Methods of applying spatial filters are well known in the art and any such method may be used.

When choosing a palette, for instance according to the YCbCr family of colour spaces, the Y component (i.e. the luminance) may be chosen as a constant over the entire palette. In one example, the Y component may be selected to be 0.5 times the maximum luminance. As a result, when combining the IR image according to the chosen palette with the visual image, the Y component of the processed visual image 304 can be added to the processed IR image 305 and yield the desired contrast without the colours of the processed IR image 305 being altered. The significance of a particular nuance of colour is thereby maintained during the processing of the original IR image 302.

When calculating the colour components, the following equations can be used to determine the components Y, Cr and Cb for the combined image 307 with the Y component from the high pass filtered visual image 304 and the Cr and Cb components from the signal of the IR image 305.

$$hp\_y\_vis = highpass(y\_vis)$$

$$(y\_ir, cr\_ir, cb\_ir) = colored(lowpass(ir\_signal\_linear))$$

Other colour spaces than YCbCr can, of course, also be used with embodiments of the present disclosure. For instance, when using the RGB colour model, the luminance can be calculated as the mean of all colour components, and by transforming equations calculating a luminance from one colour space to another, a new expression for determining a luminance will be determined for each colour space.

In one embodiment, block 107 of combining the processed visual image 304 with the processed IR image 305 can be performed using only the luminance component Y from the processed visual image 304.

It is to be noted that the blocks of the method described above can be performed in different order if suitable.

Figure 4:
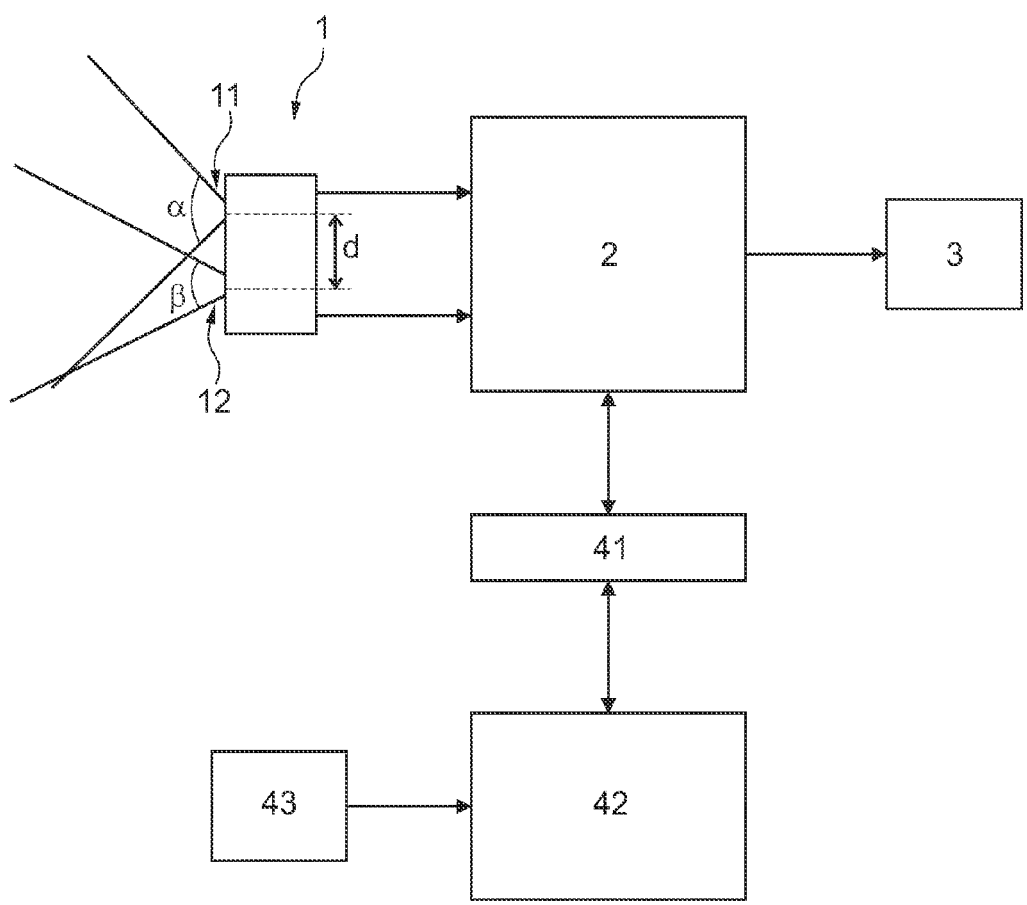
FIG. 4 shows an exemplary embodiment of an image processing system for performing a method according to an exemplary embodiment.
Figure 5A:
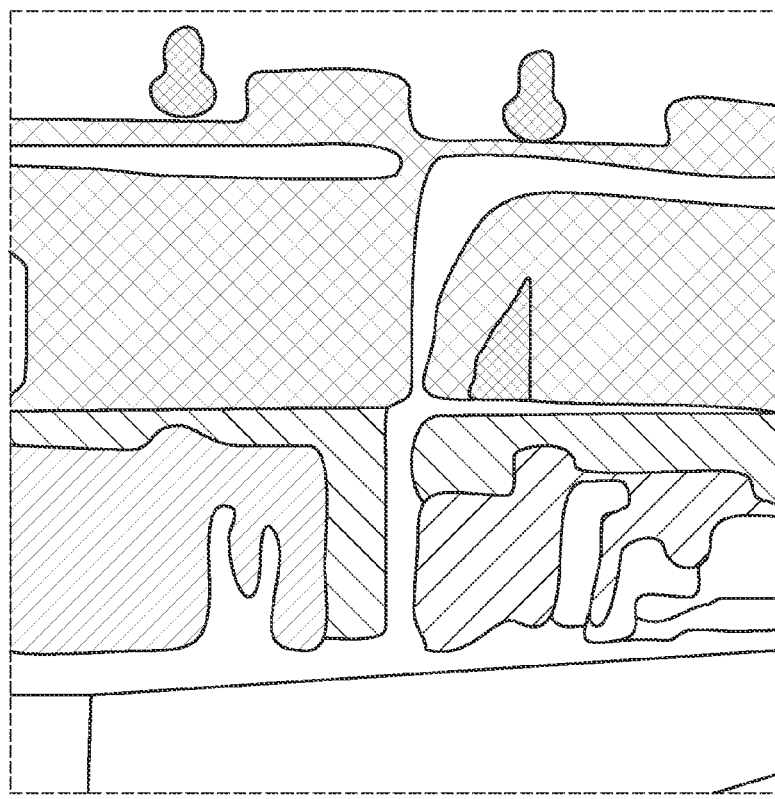
FIG. 5a shows the IR image of FIG. 3a with areas of different temperatures marked by different patterns.
Figure 5B:
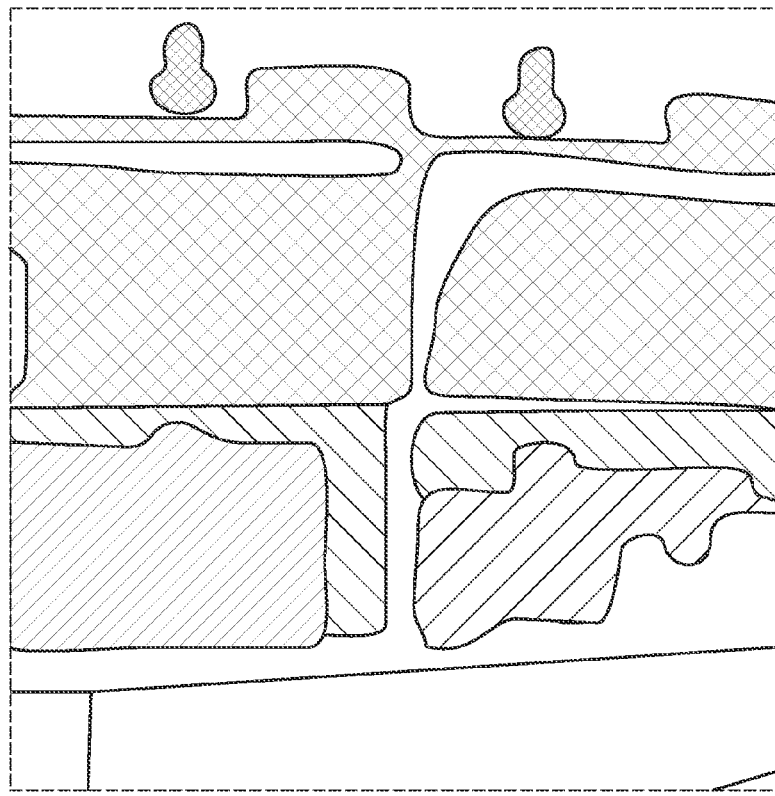
FIG. 5b shows the image of FIG. 3b with areas of different temperatures marked by different patterns.
Figure 5C:
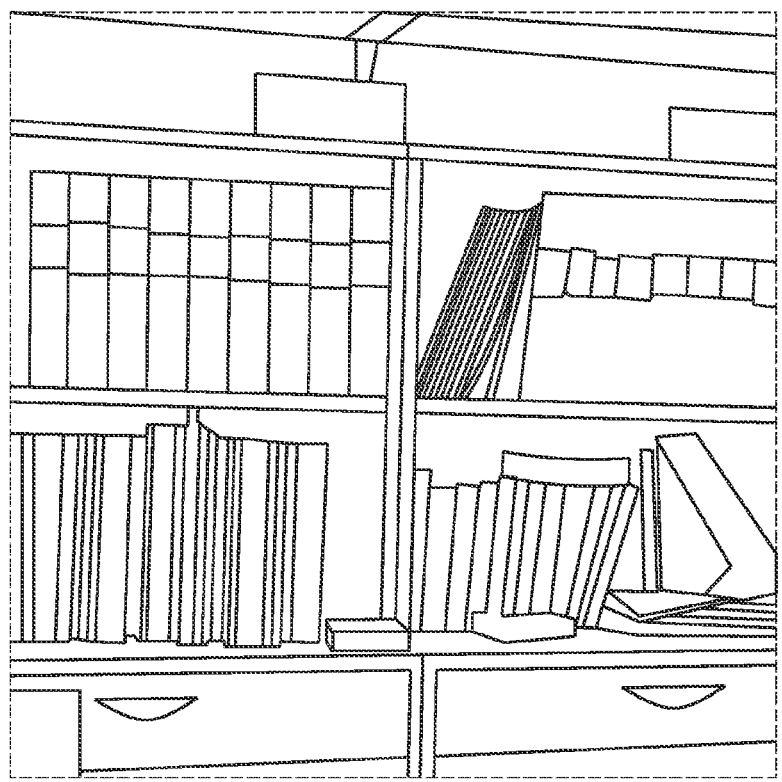
FIG. 5c shows the image of FIG. 3c.
Figure 5D:
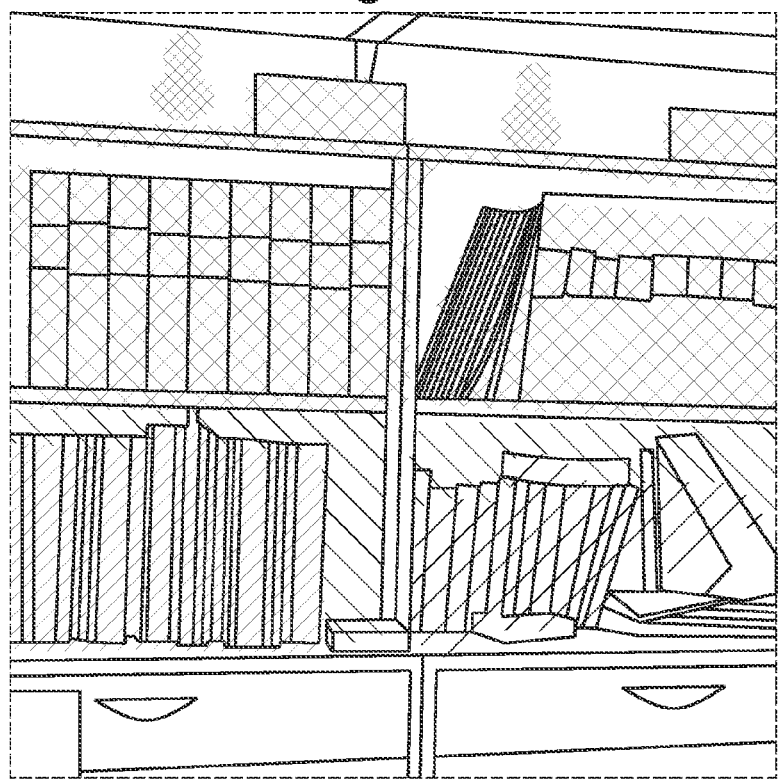
FIG. 5d shows the image of FIG. 3d with areas of different temperatures marked by different patterns.

FIG. 4 shows a schematic view of an embodiment of an image processing system for performing a method according to the present disclosure. A camera unit 1 may comprise a visual camera 11 having a visual sensor and an IR camera 12 having an IR sensor that are mounted so that an optical axis of the visual sensor of visual camera 11 is at a distance d from the IR sensor of IR camera 12. The visual camera has a visual field of view α of approximately 53°, while the IR camera has a visual field of view β of approximately 24°. It should be appreciated by one of ordinary skill that other viewing angles may be used. Blocks 101, 102, i.e. the capturing of a visual image 301 and an IR image 302 may be performed by this camera unit 1, and are transmitted to a processing unit 2, where the remaining blocks are performed. Said processing unit 2 can be a processor such as a general or special purpose processing engine such as, for example, a microprocessor, microcontroller or other control logic or an FPGA unit (Field-programmable gate array) that comprises sections of code, stored on a computer readable storage medium, that are fixed to perform certain tasks but also other sections of code, stored on a computer readable storage medium, that can be altered during use. Such alterable sections can comprise parameters that are to be used as input for the various tasks, such as the calibration of the IR camera 12, the alignment for the visual camera 11 and IR camera 12, the sample rate or the filter for the spatial filtering of the images, among others.

In this document, the terms "computer program product" and "computer-readable storage medium" may be used generally to refer to media such as memory 41, the storage medium of processing unit 2, or the storage medium of control unit 42. These and other forms of computer-readable storage media may be used to provide instructions to processing unit 2 for execution. Such instructions, generally referred to as "computer program code" (which may be grouped in the form of computer programs or other groupings), when executed, enable the camera unit 1 to perform features or functions of embodiments of the current technology. Further, as used herein, "logic" may include hardware, software, firmware, or a combination of thereof.

The processing unit 2 communicates with a memory 41 where such parameters are kept ready for use by the processing unit 2, and where the images being processed by the processing unit 2 can be stored if the user desires. Memory 41 may be a hard disk drive, a floppy disk drive, a magnetic tape drive, an optical disk drive, a CD or DVD drive (R or RW), or other removable or fixed media drive. The memory 41 in turn communicates with a control unit 42 where said parameters originate, for instance through input from a calibration file 43 that can be supplied from a manufacturer, by parameters being supplied by the image processing system itself, such as for instance data from a sensor or the like regarding the distance from the camera unit 1 to an object whose image is captured, or by parameters being supplied by the user. The control unit 42 can be a programmable unit and determine the parameters needed for performing exemplary methods and how such parameters should interact with the processing unit 2 and store these parameters in the memory 41 for easy retrieval by the processing unit 2.

After the processing unit has performed the operation of aligning the images (block 103), up-sampling the original IR image 302 to generate an up-sampled IR image (block 104), high pass filtering of the original visual image 301 to generate a processed visual image 304 (block 105), low pass filtering of the up-sampled IR image to generate a processed IR image 305 (block 106), combining the processed visual image 304 with the processed IR image 305 to generate a combined image 307 (block 107), and adding high frequency noise to this combined image 307 (block 108), the resulting image is presented in a display unit 3 in order to be viewed by the user of the image processing system. If desired, the user can save the combined image 307 or any of the other images corresponding to the different method steps to the memory 41 for later viewing or for transfer to another unit, such as a computer, for further analysis and storage.

In an alternative embodiment, disclosed methods can be implemented by a computer such as a PC that encompasses the functions of the FPGA-unit 2, the memory 41 and processing unit 42 and also the display unit 3. It would be possible to use the disclosed methods live, i.e. for a streamed set of images filtered and combined in real time, for instance at 30 Hz, that can be recorded and replayed as a movie, but it would also be possible to use still pictures.

In one example, the user may be allowed to alter a positive factor alpha for determining how much of the luminance from the visual image 301, 304 that is to be used for combining with the IR image 302, 305, for instance by using the equation below. The luminance Y of the combined image 307 is achieved by adding the luminance of the processed IR image 305 to the luminance of the highpass filtered visual image multiplied by a factor alpha. The combined components Cr and Cb are taken directly from the IR image 302, 305 and are therefore not affected by this process. If another colour space is used, the equations are of course transformed before use.

$$comb\_y = y\_ir + alpha * hp\_y\_vis$$

$$comb\_cr = cr\_ir$$

$$comb\_cb = cb\_ir$$

The variation of alpha thus gives the user an opportunity to decide how much contrast is needed in the combined image. With an alpha of close to zero, the IR image alone will be shown, but with a very high alpha, very sharp contours can be seen in the combined image. Theoretically, alpha can be an infinitely large number, but in practice a limitation will probably be necessary, to limit the size of alpha that can be chosen to what will be convenient in the current application.

The up-sampling of the resolution of the IR image 302 at block 104 can alternatively be performed as a down-sampling of the visual image 301 to match the resolution of the IR image 302, or indeed a combination of an up-sampling of the IR image 302 and a down-sampling of the visual image 301 to a resolution that none of the images 301, 302 originally have, as long as the result is that the IR image 302 and the visual image 301 have the same resolution after the sampling step. It may be convenient to determine the resolution depending on the display area such as the display unit 3 where the combined image 307 is to be displayed and to sample the image or images 301, 302 to match the resolution to the most suitable for the display unit 3.

It will be appreciated that, for clarity purposes, the above description has described embodiments of the technology with reference to different functional units and processors. However, it will be apparent that any suitable distribution of functionality between different functional units, processors or domains may be used without detracting from the technology. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The present disclosure is not to be seen as limited by the embodiments described above, but can be varied within the scope of the claims, as will be readily understood by the person skilled in the art.

What is claimed is:

1. A method of improving an infrared (IR) image, the method comprising:
    capturing a visual image of an object by a visual image sensor;
    capturing an IR image of the object by an IR image sensor;
    altering at least one of a resolution of said visual image and a resolution of said IR image;
    high pass filtering said visual image to extract pixel data representing contours and/or edges in the visual image, wherein the contours and/or edges include those pixels of the visual image that correspond to no or low contrast portions in pixels of the IR image;
    low pass filtering said IR image to reduce noise in the IR image and/or smooth the IR image; and
    combining, by a processor, luminance information of the extracted pixel data with luminance information of corresponding pixels in the IR image to augment the IR image with the contours and/or edges from the visual image, wherein the augmented IR image comprises temperature information that is unaltered by the combining.

2. A method according to claim 1, wherein the altering the at least one of the resolution comprises up-sampling the resolution of said IR image and/or down-sampling the resolution of said visual image.

3. A method according to claim 1, wherein said high pass filtering and said low pass filtering are performed by use of at least one spatial filter.

4. A method according to claim 1, wherein said combining the luminance information comprises:
    multiplying respective luminance values of the extracted pixel data of the visual image by a factor; and
    adding the luminance values of the extracted pixel data of the visual image to luminance values of the corresponding pixels in the IR image.

5. A method according to claim 4, wherein said factor can be varied by input from a user.

6. A method according to claim 1, wherein said method further comprises adding a high resolution noise to said augmented IR image.

7. A non-transitory computer readable storage medium storing executable program code which, when executed by a processor, causes the processor to perform a method comprising:
    capturing a visual image of an object using a visual image sensor;
    capturing an IR image of the object using an IR image sensor;
    altering at least one of a resolution of said visual image and a resolution of said IR image;
    high pass filtering said visual image to extract visual image information representing contours and/or edges in pixels of the visual image, wherein the contours and/or edges include those pixels of the visual image that correspond to no or low contrast portions in pixels of the IR image;
    low pass filtering said IR image to reduce noise in the IR image and/or smooth the IR image; and
    combining luminance information of the extracted visual image information with luminance information of corresponding portions in the IR image to augment the IR image with the contours and/or edges from the visual image, wherein the augmented IR image comprises temperature information that is unaltered by the combining.

8. A computer readable storage medium according to claim 7, wherein the altering the at least one of the resolution comprises up-sampling the resolution of said IR image and/or down-sampling the resolution of said visual image.

9. A computer readable storage medium according to claim 7, wherein said high pass filtering and said low pass filtering are performed by use of at least one spatial filter.

10. A computer readable storage medium according to claim 7, wherein said combining the luminance information comprises:
    multiplying respective luminance values of the pixels of the extracted visual image information by a factor; and
    adding the luminance values of the pixels of the extracted visual image information to luminance values of the corresponding pixels in the IR image.

11. A computer readable storage medium according to claim 10, wherein said factor can be varied by input from a user.

12. A computer readable storage medium according to claim 7, wherein said method further comprises adding a high resolution noise to said augmented IR image.

13. An imaging device comprising:
    a visual image sensor for capturing a visual image;
    an IR image sensor for capturing an IR image; and
    a processor adapted to:
        alter at least one of a resolution of said visual image and a resolution of said IR image;
        low pass filter said IR image to reduce noise in the IR image and/or smooth the IR image,
        high pass filter said visual image to extract pixel data representing contours and/or edges in the visual image, wherein the contours and/or edges include those pixels of the visual image that correspond to no or low contrast portions in pixels of the IR image, and
        combine luminance information of the extracted pixel data with luminance information of corresponding pixels in the IR image to augment the IR image with the contours and/or edges from the visual image, wherein the augmented IR image comprises temperature information that is unaltered by the combining.

14. An imaging device according to claim 13, wherein said low pass filtering and said high pass filtering are performed by use of at least one spatial filter.

15. An imaging device according to claim 13, wherein said processor is further adapted to:
    multiply respective luminance values of the extracted pixel data of the visual image by a factor;
    add the luminance values of the extracted pixel data of the visual image to luminance values of the corresponding pixels in the IR image to combine the luminance information.

16. An imaging device according to claim 15, wherein said factor is given by external input into the camera from a user.

17. An imaging device according to claim 15, wherein the processor is further adapted to determine said factor.

18. An image processing system comprising:
    a computer readable storage medium storing executable program code for:
        capturing a visual image of an object using a visual image sensor,
        capturing an IR image of the object using an IR image sensor,
        altering at least one of a resolution of said visual image and a resolution of said IR image,
        high pass filtering said visual image to extract visual image information representing contours and/or edges in pixels of the visual image, wherein the contours and/or edges include those pixels of the visual image that correspond to no or low contrast portions in pixels of the IR image, low pass filtering said IR to reduce noise in the IR image and/or smooth the IR image, and combining luminance information of the extracted visual image information with luminance information of corresponding portions in the IR image to augment the IR image with the contours and/or edges from the visual image, wherein the augmented IR image comprises temperature information that is unaltered by the combining; and a processor for executing the executable program code.

19. A method according to claim 1, wherein the IR image is represented in one or more colors from a palette according to temperature, and wherein the processor is co-located with the IR image sensor and the visual image sensor.

20. A method according to claim 19, wherein the combining the luminance information maintains the palette associated with the IR image.

21. A computer readable storage medium according to claim 7, wherein the IR image is represented in one or more colors from a palette according to temperature, and wherein the processor is co-located with the IR image sensor and the visual image sensor.

22. A computer readable storage medium according to claim 21, wherein the combining the luminance information maintains the palette associated with the IR image.

23. An imaging device according to claim 13, wherein the IR image is represented in one or more colors from a palette according to temperature.

24. An imaging device according to claim 23, wherein the processor is further adapted to combine the luminance information while maintaining the palette associated with the IR image.

\* \* \* \* \*

UNITED STATES PATENT AND TRADEMARK OFFICE
CERTIFICATE OF CORRECTION

PATENT NO.         : 8,520,970 B2                                          Page 1 of 1
APPLICATION NO.    : 12/766739
DATED              : August 27, 2013
INVENTOR(S)        : Katrin Strandemar It is certified that error appears in the above-identified patent and that said Letters Patent is hereby corrected as shown below:

On the title page, Item (73) Assignee:

Change the word "Flir" to --"FLIR"--

Signed and Sealed this
Twenty-fourth Day of June, 2014

Michelle K. Lee
*Deputy Director of the United States Patent and Trademark Office*